United States Patent
Coonrod (10) Patent No.: US 9,397,759 B2
(45) Date of Patent: Jul. 19, 2016

(54) ACOUSTIC FREQUENCY INTERROGATION AND DATA SYSTEM

(75) Inventor: Donald Scott Coonrod, Katy, TX (US)

(73) Assignee: Cameron International Corporation, Houston, TX (US)

( * ) Notice: Subject to any disclaimer, the term of this patent is extended or adjusted under 35 U.S.C. 154(b) by 1073 days.

(21) Appl. No.: 13/403,222

(22) Filed: Feb. 23, 2012

(65) Prior Publication Data

US 2013/0223190 A1    Aug. 29, 2013

(51) Int. Cl.

| G01V 11/00 | (2006.01) |
| H04B 11/00 | (2006.01) |
| E21B 33/035 | (2006.01) |
| H04B 13/02 | (2006.01) |
| E21B 47/14 | (2006.01) |

(52) U.S. Cl.
CPC ............ *H04B 11/00* (2013.01); *E21B 33/0355* (2013.01); *E21B 47/14* (2013.01); *G01V 11/002* (2013.01); *H04B 13/02* (2013.01)

(58) Field of Classification Search
CPC ...... H04B 11/00; H04B 13/02; G01V 11/002; E21B 33/0355; E21B 47/14
See application file for complete search history.

(56) References Cited

U.S. PATENT DOCUMENTS

| 5,365,516 A * | 11/1994 | Jandrell ................ G01S 5/0009 340/991 |
| 6,127,942 A * | 10/2000 | Welle ....................... 340/870.16 |
| 8,588,887 B2 * | 11/2013 | Arneson ............... A61B 5/0002 600/407 |
| 2006/0042799 A1 * | 3/2006 | Hosie et al. .................... 166/338 |
| 2006/0107975 A1 * | 5/2006 | Arguelles ................. B08B 3/12 134/56 R |
| 2008/0003868 A1 * | 1/2008 | Cairns ........................... 439/552 |
| 2012/0275274 A1 * | 11/2012 | Gochnour et al. ............ 367/134 |
| 2012/0279720 A1 * | 11/2012 | Whitby et al. ................ 166/363 |
| 2012/0294114 A1 * | 11/2012 | Gochnour et al. .............. 367/13 |

FOREIGN PATENT DOCUMENTS

| GB | 1167740 | 10/1969 |
| GB | 2459488 | 10/2009 |
| WO | 02088516 | 7/2002 |
| WO | 2013076499 A2 | 5/2013 |
| WO | 2013076499 A3 | 5/2013 |

OTHER PUBLICATIONS

International Search Report & Written Opinion for Application No. PCT/US2012/067140 mailed Jan. 8, 2014.
International Preliminary Report on Patentability; Application No. PCT/US2012/067140; Dated Sep. 4, 2014; 8 pages.

* cited by examiner

*Primary Examiner* — Luke Ratcliffe
*Assistant Examiner* — Hovhannes Baghdasaryan
(74) *Attorney, Agent, or Firm* — Fletcher Yoder, P.C.

(57) ABSTRACT

A system, in certain embodiments, includes a subsea acoustic frequency interrogation and data system. The subsea acoustic frequency interrogation and data system includes a master acoustic transceiver configured to broadcast an acoustic activation signal and an acoustic frequency interrogated data transmitter configured to generate power from the acoustic activation signal and activate a sensor configured to measure an operating parameter of subsea equipment.

21 Claims, 5 Drawing Sheets

ACOUSTIC FREQUENCY INTERROGATION AND DATA SYSTEM

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

A variety of subsea equipment, such as mineral extraction equipment, may include subsea instrumentation systems. For example, subsea blowout preventer (BOP) stacks, drilling riser systems, subsea production trees, and other equipment may include subsea instrumentation systems. The subsea instrumentation systems generally include wired sensors for monitoring various operating parameters, such as temperature and pressure, of the subsea equipment. Subsea instrumentation cables connected to the wired sensors provide power to the sensors and transmit measurements taken by the sensors. In addition, the number of subsea cables used may increase to satisfy redundancy of measurement requirements to improve overall reliability of subsea instrumentation. Unfortunately, subsea cables and connectors used with subsea equipment can have high costs.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Subsea equipment may include subsea instrumentation systems having sensors configured to measure various operating parameters of the subsea equipment. For example, the sensors may be configured to measure temperature or pressure of production fluid, fracing fluid, vessels, tanks, and so forth. As discussed in detail below, subsea equipment may include an acoustic frequency interrogation and data system configured to measure various operating parameters of the subsea equipment. Specifically, the acoustic frequency interrogation and data system utilizes acoustic signals to power and communicate with sensors disposed within the subsea equipment. A master acoustic transceiver (MAT) may be configured to broadcast a high-power acoustic activation signal to one or more acoustic frequency interrogated data transmitters (AFIDs) positioned on the subsea equipment. Each AFID includes one or more sensors configured to measure an operating parameter of the subsea equipment. Additionally, the AFID uses the high-powered acoustic signal to generate locally stored power and activate the sensor. After the sensor takes a measurement, the AFID acoustically transmits the sensor measurement to the MAT with an acoustic return signal. In this manner, various operating parameters of the subsea equipment may be monitored by sensors with a reduced need for wired connections. In other words, the number of instrumentation cables used for monitoring subsea equipment processes may be reduced.

The acoustic frequency interrogation and data system may be used in various types of subsea equipment. For example, the acoustic frequency interrogation and data system may be used with subsea blowout preventer (BOP) stacks, drilling riser systems, subsea production trees, and other equipment may include subsea instrumentation housings. Additionally, the acoustic frequency interrogation and data system may be used for other underwater equipment or surface equipment, including mineral extraction or other equipment. The following discussion describes an exemplary embodiment of the acoustic frequency interrogation and data system in a subsea BOP stack context. However, it should be noted that the discussion is not intended to limit the application of the acoustic frequency interrogation and data system to subsea BOP stacks.

Figure 1:
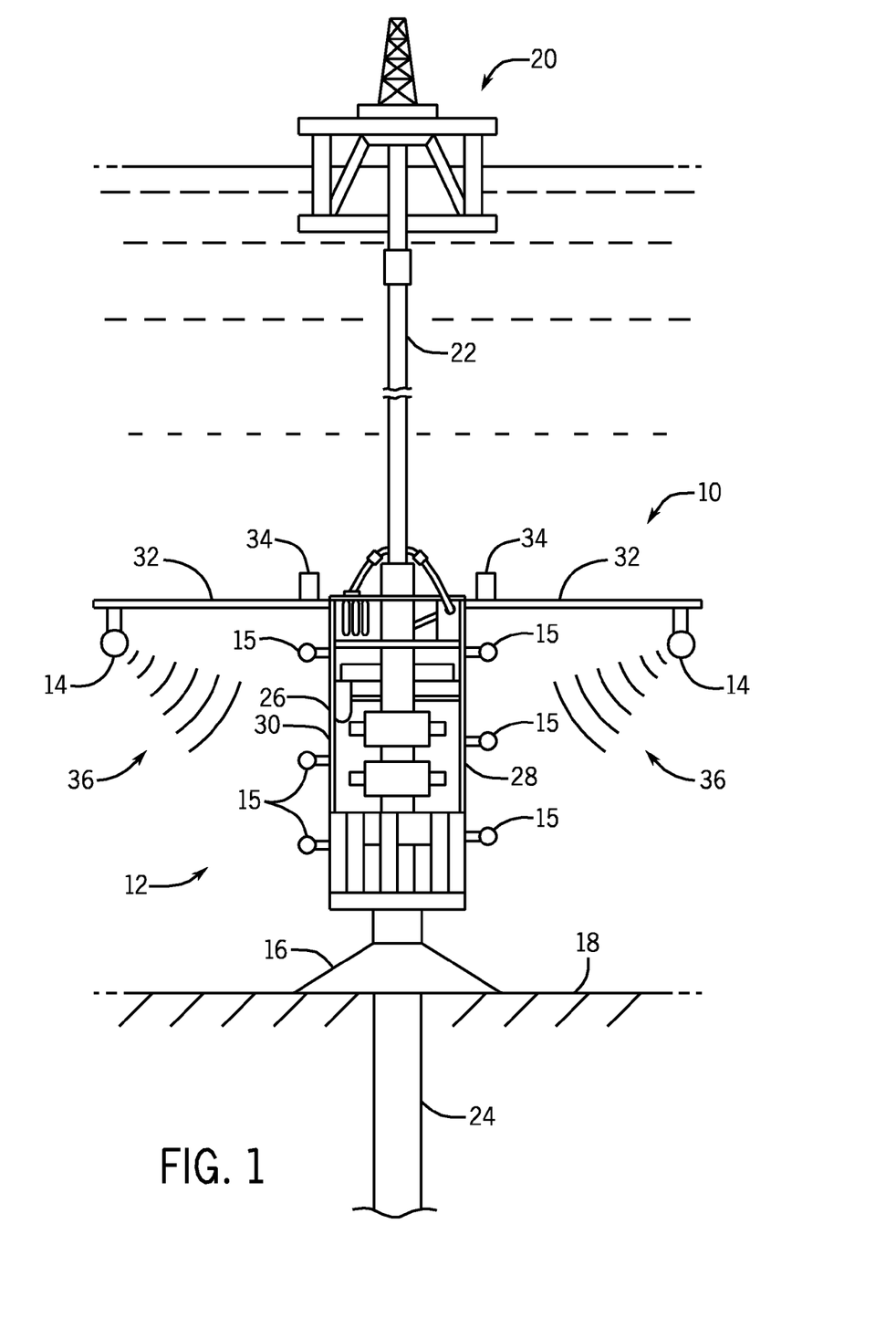
FIG. 1 is a sub-sea BOP stack assembly, which may include an acoustic frequency interrogation and data system.

Turning now to the drawings, FIG. 1 depicts a subsea BOP stack assembly 10, which includes an acoustic frequency interrogation and data system 12 having master acoustic transceivers (MATs) 14 and acoustic frequency interrogated data transmitters (AFIDs) 15. As illustrated, the BOP stack assembly 10 is assembled onto a wellhead assembly 16 on the sea floor 18. The BOP stack assembly 10 is further connected in line between the wellhead assembly 16 and a floating rig 20 through a subsea riser 22. The BOP stack assembly 10 may provide emergency fluid pressure containment in the event that a sudden pressure surge escapes the well bore 24. Therefore, the BOP stack assembly 10 may be configured to prevent damage to the floating rig 20 and the subsea riser 22 from fluid pressure exceeding design capacities. The BOP stack assembly 10 also includes a BOP lower riser package 26, which connects the subsea riser 22 to a BOP package 28.

In certain embodiments, the BOP package 28 may include a frame 30 supporting one or more AFIDs 15 configured to measure various operating parameters of the BOP package 28. Additionally, in other embodiments, AFIDs 15 may be positioned in other areas of the BOP package 28. In the illustrated embodiment, the MATs 14 are attached to supporting arms 32 extending laterally from the frame 30 of the BOP package 28. The MATs 14 may be further coupled to a subsea instrumentation system 34 by a cable or other connection. In certain embodiments, the subsea instrumentation system 34 may be configured to store or further transmit the sensor measurements collected by the AFIDs 15. As mentioned above, the MATs 14 are configured to broadcast a high-power acoustic activation signal 36 to the AFIDs 15. The high-power acoustic activation signal 36 activates each of the AFIDs 15. In other words, the high-power acoustic activation signal 36 is received by the AFIDs 15, and is used by the AFIDs 15 to generate locally stored power. As discussed in detail below, the power generated by the AFIDs 15 from the high-power acoustic activation signal 36 powers sensors which measure various operating parameters of the BOP package 28.

Figure 2:
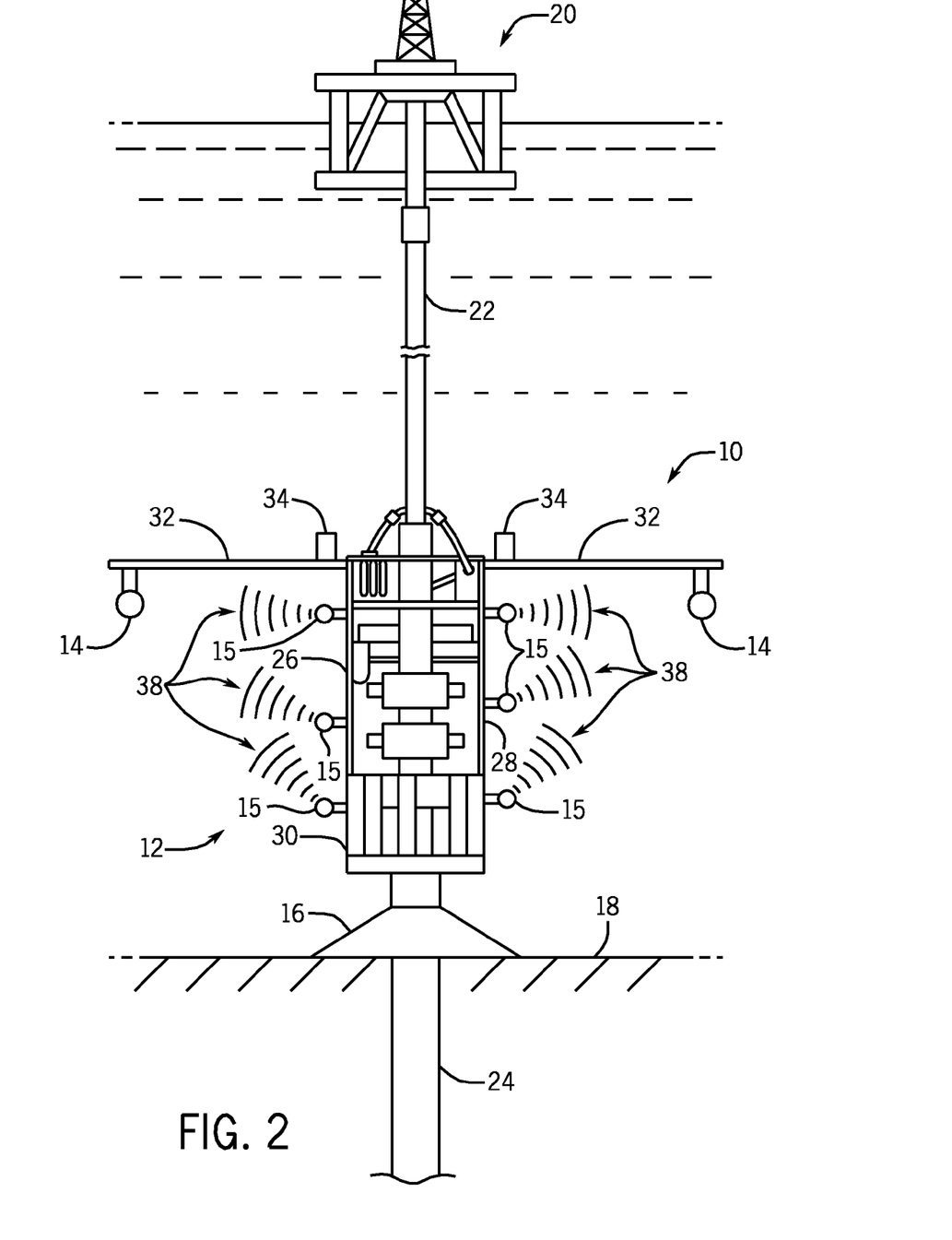
FIG. 2 is a sub-sea BOP stack assembly, which may include an acoustic frequency interrogation and data system.

FIG. 2 illustrates the subsea BOP stack assembly 10, including the MATs 14 and the AFIDs 15 of the acoustic frequency interrogation and data system 12. As mentioned above, the AFIDs 15 use power generated from the high-power acoustic activation signal 36 broadcasted by the MATs to power and activate sensors within the AFIDs 15. Specifically, the sensors measure various operating parameters, such as temperatures, pressures, flow rates, vibration, chemical composition, etc, of the BOP package 28. In this manner, the sensors of the AFIDs 15 may help monitor the processes of the BOP package 28 without requiring a hard (i.e., wired) connection between the sensors to the subsea instrumentation systems 34. Once the sensor measurement is taken, each AFID 15 acoustically transmits the sensor measurement to the MATs 14. In particular, each AFID 15 sends an acoustic return signal 38 to the MATs 14. The MATs 14 may then transmit the sensor measurements to the subsea instrumentation systems 34. As discussed below, the AFIDs 15 send the return signals 38 using a protocol, such as an Ethernet protocol, that enables the AFIDs 15 to communicate with the MATs 14 one at a time.

After the AFIDs 15 transmit the return signals 38 to the MATs 14, the AFIDs 15 wait until another high-power acoustic activation signal 36 is sent by the MATs 14. For example, the AFIDs 15 may shut down after the power generated from the initial high-power acoustic activation signal 36 runs out. When the MATs 14 send another high-power acoustic activation signal 36, the AFIDs 15 will again generate power from the signal 36 and the sensors within the AFIDs will take additional sensor measurements that will be transmitted to the MATs with the acoustic return signals 38.

Figure 3:
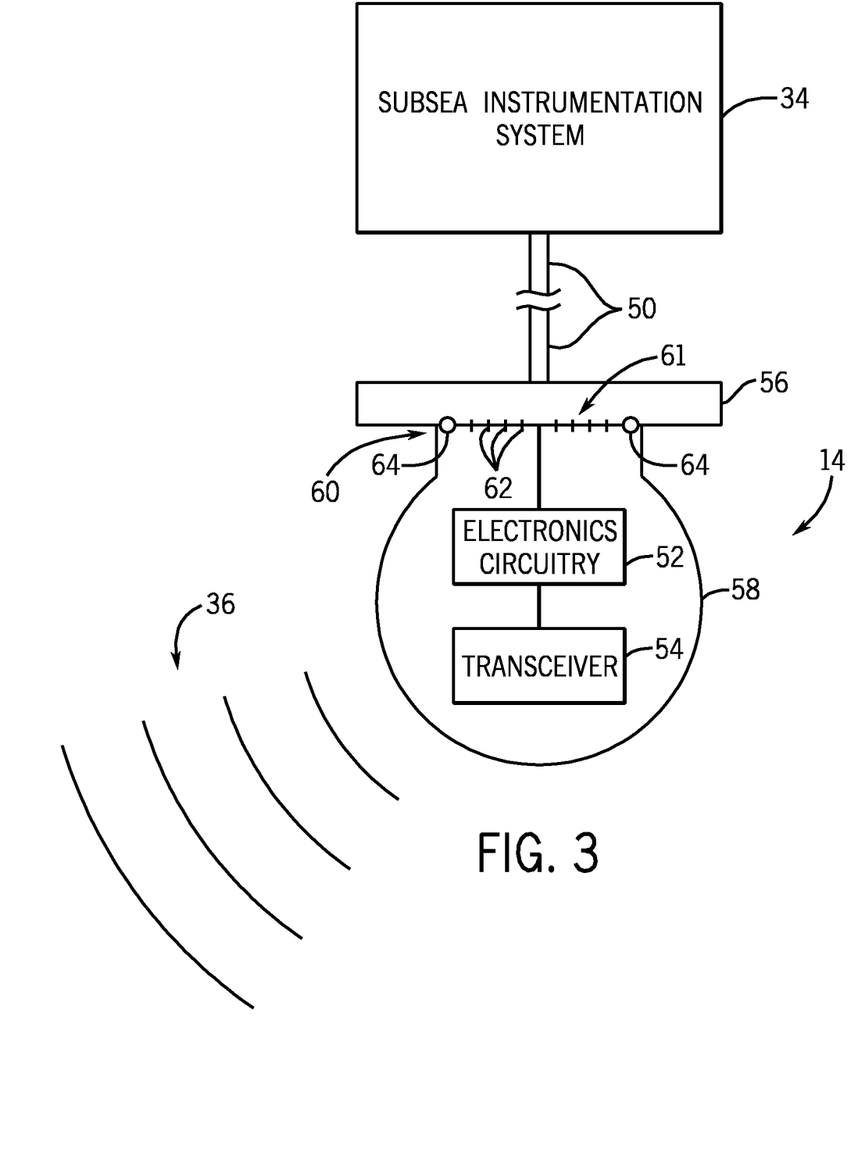
FIG. 3 is an embodiment of master acoustic transceiver configured to broadcast a high-power acoustic activation signal to one or more acoustic frequency interrogated data transmitters.

FIG. 3 illustrates an embodiment of the MAT 14 which may be used with the acoustic frequency interrogation and data system 12. As mentioned above, the MAT 14 is configured to broadcast the high-power acoustic activation signal 36 to one or more AFIDs 15. In the illustrated embodiment, the MAT 14 is coupled to the subsea instrumentation system 34 by a cable 50. As discussed above, the MAT 14 may be coupled to the subsea instrumentation system 34 by other communication techniques, such as a wireless connection.

As shown, the MAT 14 includes electronics circuitry 52. The electronics circuitry 52 is configured to control a transceiver 54 of the MAT 14. For example, the electronics circuitry 52 is configured to generate and control the frequency of the high-power acoustic activation signal 36 broadcasted by the transceiver 54 of the MAT 14. In certain embodiments, the high-power acoustic activation signal 36 may be broadcasted by the transceiver 54 at 30 to 80, 35 to 75, 40 to 60, or 45 to 55 Hertz. Furthermore, in embodiments of the acoustic frequency interrogation and data system 12 having multiple AFIDs 15, the MAT 14 may communicate with each AFID 15 using the same frequency or different frequencies. Additionally, the high-power acoustic activation signal 36 may be broadcasted at different power levels. For example, the high-power acoustic activation signal 36 may be broadcasted at 2 to 50, 4 to 40, 6 to 30, or 8 to 20 watts.

The transceiver 54 broadcasts the high-power acoustic activation signal 36 to communicate with the AFIDs 15. For example, in certain embodiments, the high-power acoustic activation signal 36 may include a high-power tone and an acoustic message, which may include information, such as a time stamp. As described in detail below, the AFIDs 15 use the high-power acoustic activation signal 36 broadcasted by the transceiver 54 to power sensors configured to measure operating parameters of the BOP package 28.

The MAT 14 includes a mounting portion 56 and a housing 58, containing the electronics circuitry 52 and the transceiver 54, which are removably coupled and may be manufactured from corrosion resistant alloys. In other words, the mounting portion 56 and the housing 58 of the MAT 14 may be selectively disconnected from one another. In this manner, the housing 58 may be removed from the mounting portion 56 for maintenance, repair, or replacement. For example, the mounting portion 56 may be coupled to or fixed to the supporting arms 32 extending from the BOP package 28, and the housing 58 may be coupled to the mounting portion 56 with a dry-mate connector 60. The dry-mate connector includes a pin and socket connection 61 having pins 62 configured to transmit electrical signals between the subsea instrumentation system 34 and the electronics circuitry 52. Additionally, the dry-mate connector 60 is configured to withstand a subsea environment. That is, the dry-mate connector 60 may be configured to withstand elevated pressures and may be corrosion-resistant. Furthermore, the dry-mate connector 60 may be designed to be water resistant or waterproof to block sea water from contacting the pins 62 when the MAT 14 is in operation. For example, the dry-mate connector 60 includes a seal 64 between the mounting portion 56 and the housing 58. The seal 64 is configured to block sea water from entering the MAT 14 and contacting the pins 62. In certain embodiments, the dry-mate connector 60 may couple the mounting portion 56 and the housing 58 with a threaded connection or a compression fit connection. Additionally, the dry-mate connector 60 may have a mechanical locking mechanism.

Figure 4:
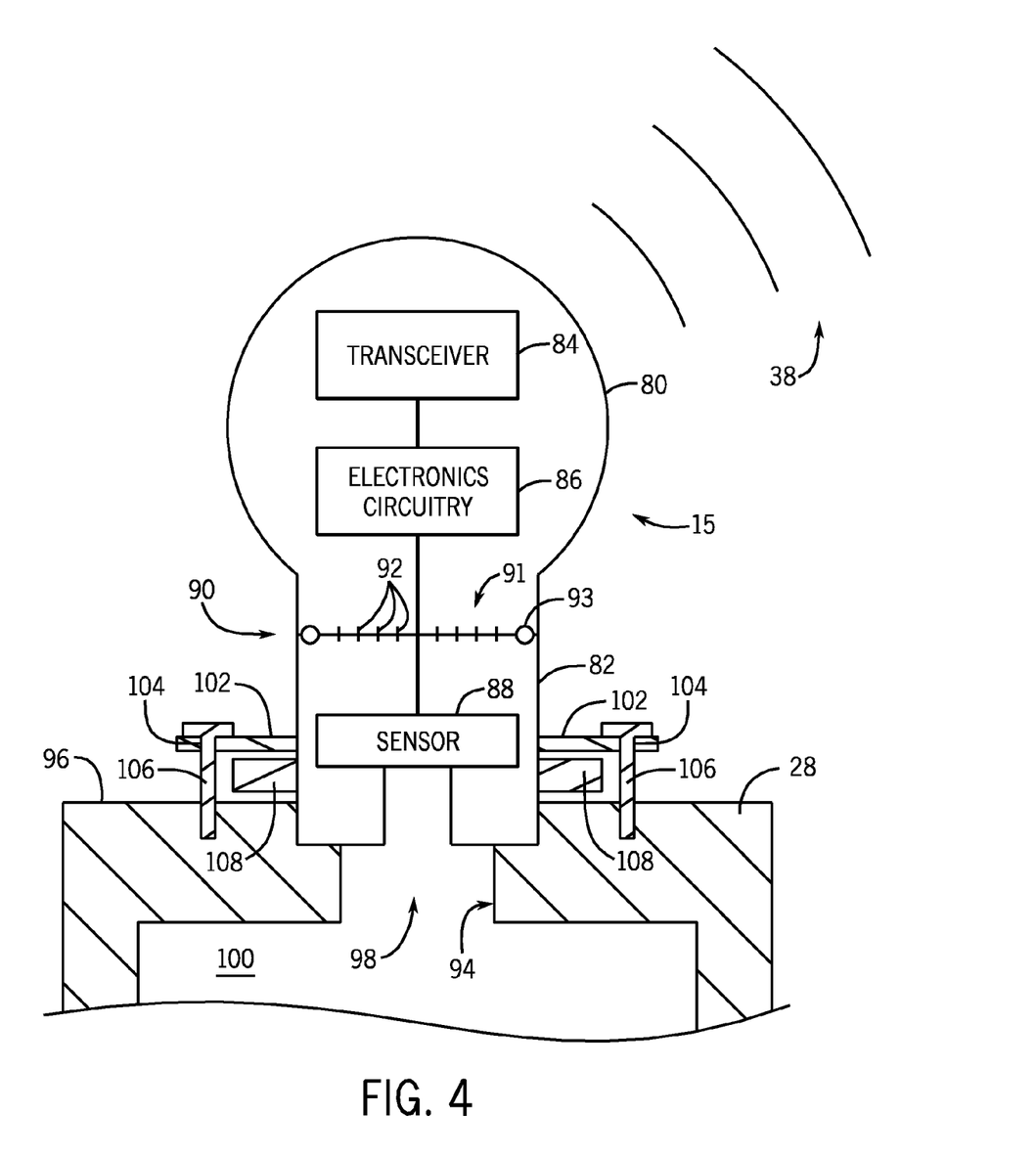
FIG. 4 is an embodiment of an acoustic frequency interrogated data transmitter configured to generate locally stored power from a high-powered acoustic signal.

FIG. 4 illustrates an embodiment of the AFID 15 configured to generate locally stored power from the high-power acoustic activation signal 36 and take sensor measurements from the subsea BOP package 28. Additionally, the AFID 15 is configured to acoustically transmit data containing the sensor measurements to the MAT 14. In the illustrated embodiment, the AFID 15 includes a process acoustic module 80 and a process sensor module 82, which may be manufactured from corrosion resistant alloys. The process acoustic module 80 is a housing that encloses a transceiver 84 and electronics circuitry 86, and the process sensor module 82 is a housing that encloses a sensor 88. In certain embodiments, the process sensor module 82 may enclose one or more sensors 88. For example, the process sensor module 82 may enclose 1, 2, 3, 4, 5, 6, 7, 8, 9, 10, or more sensors 88. The transceiver 84 is configured to receive the high-power acoustic activation signal 36 broadcasted by the transceiver 54 of the MAT 14. As shown, the transceiver 84 is coupled to the electronics circuitry 86. The electronics circuitry 86 uses the high-power acoustic activation signal 36 to generate power. As discussed below, the power generated by the electronics circuitry 86 powers the sensor 88 of the AFID 15.

As shown, the process acoustic module 80 and the process sensor module 82 are coupled to one another with a dry-mate connector 90. As similarly described above, the dry-mate connector 90 includes a pin in socket connection 91 having pins 92 configured to transmit electrical signals between the electronics circuitry 86 and the sensor 88. Additionally, the dry-mate connector 90 is configured to withstand subsea environments. For example, the dry-mate connector 90 may be capable of withstanding elevated pressures and may be corrosion-resistant. The dry-mate connector 90 may be designed to be water resistant or waterproof to prevent sea water from contacting the pins 92 when the AFID 15 is in operation. For example, the dry-mate connector 90 includes an annular seal 93 disposed between the process acoustic module 80 and the process sensor module 82. In certain embodiments, the dry-mate connector 90 may couple the process acoustic module 80 to the process sensor module 82 with a threaded connection or a compression fit connection. Furthermore, the dry-mate connector 90 may include a mechanical lock configured to block inadvertent disconnection of the dry-mate connector 90.

As mentioned above, the AFID 15 is coupled to the BOP package 28 and is configured to measure various operating parameters of the BOP package 28 with the sensor 88. Specifically, the process sensor module 82 is partially disposed within an opening 94 in an exterior surface 96 of the BOP package 28. Additionally, the process sensor module 82 has an opening 98 configured to expose the sensor 88 to an interior 100 of the BOP package 28. In this manner, the sensor 88 may be exposed to operating conditions, such as temperatures or pressures, within the BOP package 28.

The process sensor module 82 may be mounted to the BOP package 28 in a variety of manners. For example, in the illustrated embodiment, the process sensor module 82 includes mounting flanges 102 extending laterally from the process sensor module 82. The mounting flanges 102 include apertures 104 configured to receive fasteners 106, which secure the mounting flanges 102 to the exterior surface 96 of the BOP package 28. The fasteners 106 may be bolts or other types of fastener. Additionally, an annular seal 108 is disposed between the mounting flanges 102 and the exterior surface 96 of the BOP package 28. The annular seal 108 may help block sea water from entering the BOP package 28 through the opening 94. Moreover, the annular seal 108 may help reduce or prevent contents, such as operating fluids, within the BOP package 28 from exiting the BOP package 28 through the opening 94. In other embodiments, the opening 94 in the exterior surface 96 may be a threaded port and the process sensor module 82 may have a threaded exterior. In this manner, the AFID 15 may be coupled to the BOP package 28 with a threaded connection.

As mentioned above, the AFID 15 is configured to convert the high-power acoustic activation signal 36 into power that may be used to power the sensor 88. When the transceiver 84 of the AFID 15 detects the high-power acoustic activation signal 36, the transceiver 84 sends the signal 36 to the electronics circuitry 86, which subsequently converts the signal 36 into power. The power generated by the electronics circuitry 86 is used to power the sensor 88. Specifically, once the electronics circuitry 86 generates power from the high-power acoustic activation signal 36 and supplies the power to the sensor 88, the sensor 88 is activated and the sensor 88 begins to take measurements. For example, the sensor 88 may take a temperature or pressure measurement of the interior 100 of the BOP package 28, in the manner described above. That is, the sensor 88 is exposed to the interior 100 of the BOP package 28 through the opening 94 in the exterior surface 96 of the BOP package 28 and through the opening 98 in the process sensor module 82.

After the sensor 88 takes a sensor measurement, the sensor measurement is transmitted to the MAT 14. Specifically, the sensor measurement is sent from the sensor 88 to the transceiver 84 by the electronics circuitry 86. Thereafter, the transceiver 84 acoustically sends the sensor measurement to the MAT 14 with the acoustic return signal 38. For example, the acoustic return signal 38 may have a frequency of approximately 30 to 80, 35 to 75, 40 to 60, or 45 to 55 Hertz. As mentioned above, the transceiver 84 of the AFID 15 may send the acoustic return signal 38 using an Ethernet protocol. In this manner, the transceiver 84 may communicate with the MAT 14 only when no other AFID 15 is communicating with the MAT 14. For example, the transceiver 84 of the AFID 15 may monitor and detect acoustic communications by the MAT 14 or other AFIDs 15. More specifically, if no acoustic communications are detected from the MAT 14 or other AFIDs 15, the AFID 15 may wait a random length of time (e.g., 10 to 20 milliseconds), and if acoustic communications from the MAT 14 or other AFIDs 15 are still not detected, the AFID 15 may broadcast the acoustic return signal 38 containing the sensor measurement data. As a result, the acoustic frequency interrogation and data system 12 may have multiple AFIDs 15 communicating with one MAT 14.

After the sensor measurement data is transmitted to the MAT 14, the AFID 15 will shut down once the power generated from the high-power acoustic activation signal 36 runs out. In other words, the sensor 88 will shut down and stop taking sensor measurements when the power generated from the high-power acoustic activation signal 36 runs out. Upon the receipt of another high-power acoustic activation signal 36 from the MAT 14, the AFID 15 will generate additional power and resume taking and transmitting sensor measurements to the MAT 14, in the manner described above.

Figure 5:
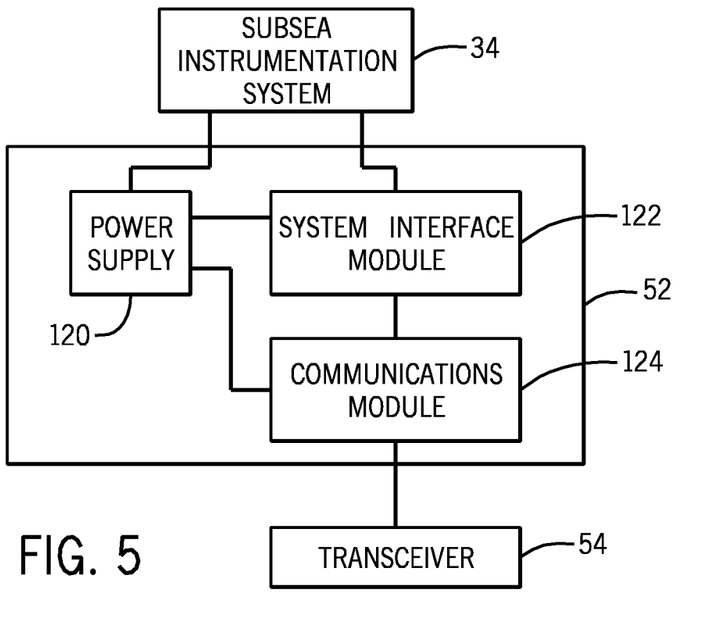
FIG. 5 is a schematic illustrating an embodiment of the electronics circuitry of the master acoustic transceiver.

FIG. 5 is a schematic of the electronics circuitry 52 of the MAT 14. In the illustrated embodiment, the electronics circuitry 52 includes a power supply 120, a system interface module 122, and a communications module 124. As discussed above, the electronics circuitry 52 is coupled to the subsea instrumentation system 34. More specifically, the subsea instrumentation system 34 is coupled to the power supply 120 and the system interface module 122 of the electronics circuitry 52. The power supply 120 is configured to provide the power required to broadcast the high-power acoustic activation signal 36. For example, the power supply 120 may be an AC power supply, or a DC power supply, such as a battery.

As shown, the power supply 120 supplies power to the system interface module 122 and the communications module 124. As mentioned above, the system interface module 122 is coupled to the subsea instrumentation system 34. Additionally, the system interface module 122 communicates with the subsea instrumentation system 34. For example, the system interface module 122 may receive commands or other instructions from the subsea instrumentation system 34. In certain embodiments, the subsea instrumentation system 34 may provide instructions regarding the timing, length, or magnitude of the high-power acoustic activation signal 36 to be generated by the MAT 14. Thereafter, the system interface module 122 may communicate the instructions to the communications module 124, which is coupled to the transceiver 54 of the MAT 14. For example, the communications module 124 may direct power from the power supply 120 to the transceiver 54 based on instructions received from the system interface module 122. Based on the instructions received from the system interface module 122, the communications module 124 may direct the transceiver 54 to generate a particular high-power acoustic activation signal 36.

Additionally, as discussed above, the transceiver 54 is configured to receive the acoustic return signal 38 containing sensor measurement data from the AFID 15. Upon receiving the acoustic return signal 38, the transceiver 54 communicates the acoustic return signal 38 to the communications module 124, which then communicates the acoustic return signal 38 to the system interface module 122. Subsequently, the system interface module 122 may communicate the acoustic return signal 38 containing the sensor measurement data to the subsea instrumentation system 34 for storage, analysis, further communication, etc.

Figure 6:
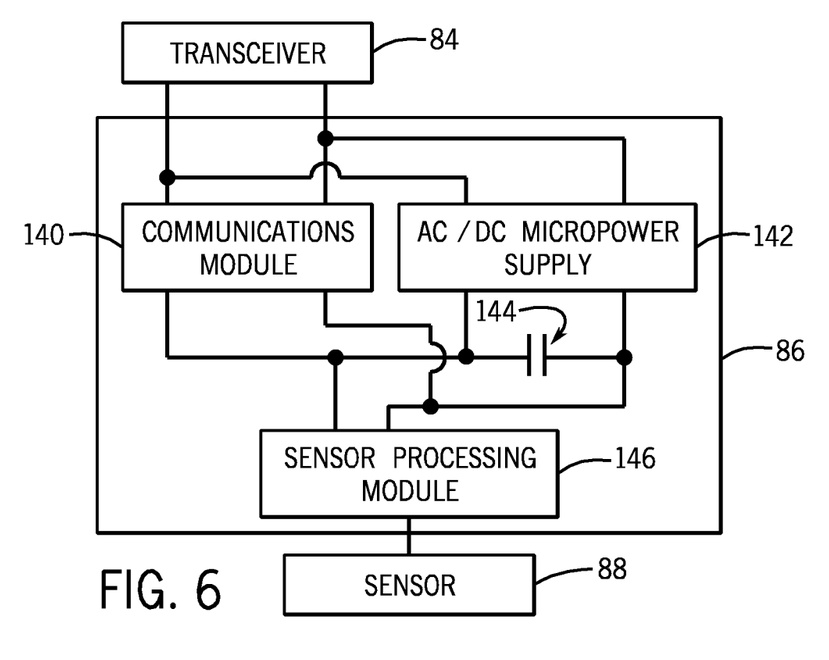
FIG. 6 is a schematic illustrating an embodiment of the electronics circuitry of the acoustic frequency interrogated data transmitter.

FIG. 6 is a schematic of the electronics circuitry 86 of the AFID 15. As shown, the electronics circuitry 86 of the AFID 15 includes a communications module 140, an AC/DC micropower supply 142, a capacitor 144 (e.g., an ultracapacitor), and a sensor processing module 146. The transceiver 84 is coupled to the communications module 140 and the AC/DC micropower supply 142. As discussed above, the electronics circuitry 84 is configured to generate power from the high-power acoustic activation signal 36 broadcasted by the MAT 14. Specifically, the high-power acoustic activation signal 36 received by the transceiver 84 of the AFID 15 is communicated to the AC/DC micropower supply 142. The AC/DC micropower supply 142 generates an alternating voltage from the high-power acoustic activation signal 36, and the alternating voltage is then rectified and stored in the capacitor 144. The stored electrical power in the capacitor 144 is subsequently used to power the communications module 140 and the sensor processing module 144.

Using power from the capacitor 144, the sensor processing module 146 executes data acquisition instructions and activates the sensor 88. Once the sensor 88 takes one or more measurements, the sensor processing module 146 transmits the sensor measurement data to the communications module 140. Thereafter, the communications module 140 communicates the sensor measurement data to the transceiver 84, which broadcasts the sensor measurement data as a part of the acoustic return signal 38. In the manner described above, the acoustic return signal 38 is then received and processed by the MAT 14.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
   a subsea acoustic frequency data system, comprising:
      a master acoustic transceiver configured to broadcast an acoustic activation signal, wherein the master acoustic transceiver is configured to be disposed subsea and couple to a support structure of a blowout preventer stack; and
      an acoustic frequency data transmitter configured to generate power from the acoustic activation signal and activate a sensor configured to measure an operating parameter of subsea equipment, wherein the acoustic frequency data transmitter is configured to be disposed subsea.

2. The system of claim 1, wherein the master acoustic transceiver comprises electronics circuitry configured to generate the acoustic activation signal and a transceiver configured to broadcast the acoustic activation signal.

3. The system of claim 1, wherein the acoustic frequency data transmitter comprises a process acoustic module and a process sensor module, where the process acoustic module and the process sensor module are removably coupled to one another.

4. The system of claim 3, wherein the process acoustic module and the process sensor module are removably coupled to one another with a dry-mate connector having electrical contacts protected by at least one seal.

5. The system of claim 3, wherein the process acoustic module comprises a transceiver configured to receive the high-power acoustic activation signal.

6. The system of claim 5, wherein the transceiver is configured to transmit an acoustic return signal containing sensor measurement data.

7. The system of claim 6, wherein the transceiver is configured to transmit the acoustic return signal using an Ethernet protocol.

8. The system of claim 3, wherein the process sensor module comprises electronics circuitry configured to generate power from the acoustic activation signal.

9. The system of claim 1, wherein the acoustic frequency data transmitter is configured to be partially mounted within an opening of subsea equipment.

10. The system of claim 1, wherein the master acoustic transceiver is connected to a subsea instrumentation housing configured to monitor operating parameters of the subsea equipment.

11. The system of claim 1, comprising a plurality of acoustic frequency data transmitters, each acoustic frequency data transmitter configured to communicate with the master acoustic transceiver.

12. The system of claim 11, wherein the master acoustic transceiver is configured to broadcast the acoustic activation signal to each of the plurality of acoustic frequency data transmitters.

13. The system of claim 11, wherein each of the plurality of acoustic frequency data transmitters communicate data to the master acoustic transceiver in series with one another.

14. The system of claim 1, comprising subsea equipment having the subsea acoustic frequency data system.

15. A subsea system, comprising:
   a master acoustic transceiver configured to couple to a support structure of a blowout preventer stack; and
   an acoustic frequency data transmitter, comprising:
      a first transceiver configured to receive an acoustic activation signal from a second transceiver of a master acoustic transceiver, and the first transceiver is configured to transmit an acoustic return signal containing sensor measurement data;
      electronics circuitry configured to convert the acoustic activation signal into power; and
      a sensor configured to measure an operating parameter, wherein the sensor is powered by the power generated by the electronics circuitry, and the sensor is exposed to an interior of the blowout preventer stack.

16. The subsea system of claim 15, comprising subsea equipment having the acoustic frequency data transmitter and the master acoustic transceiver, wherein the operating parameter is a subsea equipment operating parameter.

17. A subsea system, comprising:
a master acoustic transceiver comprising a first transceiver configured to broadcast an acoustic activation signal to a second transceiver of an acoustic frequency data transmitter to cause power generation with the acoustic activation signal at the second transceiver, wherein the first transceiver is configured to receive an acoustic return signal containing sensor measurement data from the second transceiver after power generation at the second transceiver, and wherein the master acoustic transceiver is coupled to a support arm extending from a blowout preventer stack.

18. The subsea system of claim 17, comprising the acoustic frequency data transmitter, comprising:
the second transceiver;
electronics circuitry configured to convert the acoustic activation signal into power; and
a sensor configured to measure an operating parameter, wherein the sensor is powered by the power generated by the electronics circuitry.

19. The subsea system of claim 18, comprising subsea equipment having the master acoustic transceiver and the acoustic frequency data transmitter, wherein the operating parameter is a subsea equipment operating parameter.

20. The subsea system of claim 15, wherein the operating parameter is a temperature or a pressure within the interior of the blowout preventer stack.

21. The subsea system of claim 17, wherein the master acoustic transceiver comprises a mounting portion configured to mount to the support arm and a housing containing the first transceiver, wherein the mounting portion and the housing are removably coupled to one another with a dry-mate connector.

* * * * *